(12) United States Patent
Shioiri et al.

(10) Patent No.: US 8,598,811 B2
(45) Date of Patent: Dec. 3, 2013

(54) PROJECTION-TYPE DISPLAY DEVICE AND METHOD OF CONTROLLING THEREOF

(75) Inventors: Kenichi Shioiri, Matsumoto (JP); Masahide Tsuda, Shiojiri (JP); Osamu Saito, Matsumoto (JP); Shigehiro Yanase, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 354 days.

(21) Appl. No.: 13/187,739

(22) Filed: Jul. 21, 2011

(65) Prior Publication Data

US 2012/0032598 A1 Feb. 9, 2012

(30) Foreign Application Priority Data

Aug. 3, 2010 (JP) ................................. 2010-174405

(51) Int. Cl.
*G05F 1/00* (2006.01)

(52) U.S. Cl.
USPC ........... 315/307; 315/360; 315/224; 315/291; 315/121; 315/127; 353/85

(58) Field of Classification Search
USPC ........... 315/121, 127, 169.1–169.3, 291, 294, 315/307, 224, 247, 312, 360; 353/79, 85, 353/94; 362/225, 249.02, 249.05
See application file for complete search history.

(56) References Cited

U.S. PATENT DOCUMENTS 6,543,900 B2 * 4/2003 Noji et al. ........................ 353/94
7,178,941 B2 * 2/2007 Roberge et al. ............... 362/225

FOREIGN PATENT DOCUMENTS

JP 2002-367791 A 12/2002
JP 2004-303507 A 10/2004

* cited by examiner

*Primary Examiner* — Haiss Philogene
(74) *Attorney, Agent, or Firm* — ALG Intellectual Property, LLC

(57) ABSTRACT

A projection-type display device according to an embodiment of the invention modulates light emitted from a solid-state light source array and projects the modulated light on a screen. The projection-type display device includes a power source device that generates power used for driving the solid-state light source array using power supplied from a power source, an instant interruption detecting circuit that detects an instant interruption of the power source, and a control device that, in a case where the instant interruption of the power source is detected by the instant interruption detecting circuit, performs control of extinguishing the solid-state light source array during at least a part of an instant interruption period until recovery after the detection of the instant interruption of the power source.

9 Claims, 7 Drawing Sheets

PROJECTION-TYPE DISPLAY DEVICE AND METHOD OF CONTROLLING THEREOF

BACKGROUND

1. Technical Field

The present invention relates to a projection-type display device such as a projector and a method of controlling thereof.

2. Related Art

As is widely known, a projection-type display device such as a projector is a device that includes a light source, an optical modulation device, and a projection lens and displays an image on a screen by modulating light emitted from the light source by using the optical modulation device and projecting the modulated light onto the screen by using the projection lens. Generally, projectors include a lamp such as a halogen lamp, a metal halide lamp, or a high-pressure mercury lamp as the light source. However, recently, projection-type display devices including solid-state light sources such as an LD (Laser Diode) and an LED (Light Emitting Diode) have been actively developed.

Here, the above-described various lamps used as light sources of the projectors have characteristics that the lamps are extinguished at a time when an applied voltage is lower than a specific voltage and it takes a long time (for example, several minutes or more time) for the lamps to be relighted. Accordingly, in a general projector including such a lamp, a circuit is arranged which is used for maintaining the lighting state of the lamp for an interval (for example, about one second) of some degree even in a case where an instant interruption (instant voltage drop) of the power source occurs.

In JP-A-2004-303507, a device is disclosed which decreases a current output from a converter circuit by changing PWM (Pulse Width Modulation) control for the converter circuit so as to avoid rapid consumption of interlay-stored energy in a case where an input voltage is lowered to be equal to or lower than a predetermined value, thereby maintaining discharge of a lamp. In addition, in JP-A-2002-367791, a device is disclosed which performs a countermeasure of an instant interruption by decreasing the power supplied from a capacitor to a discharge lamp based on a detection result of an instant interruption detecting unit that detects an instant interruption of the power source.

However, a solid-state light source, differently from the above-described various lamps, has characteristics that it can be instantly relighted by supplying a predetermined current used for lighting the solid-state light source even when the applied voltage is lowered to zero [V]. Accordingly, in a projector including a solid-state light source as a light source, unlike JP-A-2004-303507 and JP-A-2002-367791, it may be thought that control of continuously supplying minimum power necessary for lighting the lamp to the lamp in a case where an instant interruption occurs is unnecessary, and a circuit used for maintaining the lighting state of the lamp is unnecessary.

However, in a case where the circuit used for maintaining the lighting state is omitted in the projector including the solid-state light source, the display of an image on a screen is stopped when an instant interruption occurs, and there is a concern that a user may erroneously determine that the projector is out of order. In addition, in order to redisplay the image that has been stopped due to the instant interruption on the screen, the user needs to input power to the projector again, and accordingly, the user is compelled to perform an inconvenient operation. Considering such problems, also in the projector including a solid-state light source, the circuit used for maintaining the lighting state in a case where an instant interruption occurs needs to be included.

Here, the circuits disclosed in JP-A-2004-303507 and JP-A-2002-367791 described above need to continuously supply minimum power necessary for lighting the lamp to the lamp when an instant interruption occurs. Accordingly, there are problems in that the efficiency is low, and the period during which lighting can be maintained is limited. In addition, since the power supplied to the lamp is not allowed to be equal to or lower than the minimum power, there is a problem in that a countermeasure in which the lighting period is lengthened by performing precise control cannot be performed.

SUMMARY

An advantage of some aspects of the invention is that it provides a projection-type display device and a method of controlling thereof that are capable of lengthening a period during which the solid-state light source can be lighted in a case where an instant interruption of the power source occurs.

An aspect of the invention is directed to a projection-type display device including: a solid-state light source; an optical modulation device that modulates light emitted from the solid-state light source; a projection optical system that projects the light modulated by the optical modulation device on a screen; a power source device that generates power used for driving the solid-state light source using power supplied from a power source; an instant interruption detecting device that detects an instant interruption of the power source; and a control device that, in a case where the instant interruption of the power source is detected by the instant interruption detecting device, performs control of extinguishing the solid-state light source during at least a part of an instant interruption period until recovery after the detection of the instant interruption of the power source.

According to the above-described projection-type display device, when an instant interruption of the power source is detected by the instant interruption detecting device, the control device performs control of extinguishing the solid-state light source during at least a part of an instant interruption period until recovery after the detection of the instant interruption of the power source. Accordingly, the power consumption of the solid-state light source is reduced, and a period during which the solid-state light source can be lighted can be lengthened, compared to a general case.

The above-described projection-type display device may be configured such that the control device performs control of extinguishing the solid-state light source over an entirety of the instant interruption period.

In such a case, when an instant interruption of the power source occurs, the solid-state light source is extinguished over the entirety of the instant interruption period, whereby the power consumption of the solid-state light source can be configured to be almost zero. Here, by performing control of lighting the solid-state light source at an arbitrary timing, the solid-state light source can be instantly relighted by the accumulated power.

The above-described projection-type display device may be configured such that the control device performs control of intermittently extinguishing the solid-state light source by intermittently stopping the power supplied from the power source device to the solid-state light source through pulse-width modulation.

In such a case, when an instant interruption of the power source occurs, the power supplied from the power source device to the solid-state light source is intermittently stopped through pulse-width modulation so as to intermittently extinguish the solid-state light source. Accordingly, the average light intensity of light emitted from the solid-state light source decreases. Therefore, the power consumption of the solid-state power source is reduced, and accordingly, the period during which the solid-state light source can be lighted can be lengthened, compared to a general case.

The above-described projection-type display device may be configured such that the solid-state light source includes a plurality of solid-state light source elements, and the control device performs control of extinguishing at least one of the solid-state light source elements during at least a part of the instant interruption period.

Here, the control device may perform control of extinguishing a part of the solid-state light source elements and intermittently extinguishing a remaining part of the solid-state light source elements over an entirety of the instant interruption period.

Alternatively, the control device may perform control of sequentially changing the solid-state light source element to be extinguished out of the solid-state light source elements.

At this time, the control device may change the solid-state light source elements to be extinguished in units of the solid-state light source elements corresponding to a number set in advance.

Furthermore, the control device may perform control of decreasing a current supplied to the solid-state light source during a period, in which the solid-state light source is lighted, in the instant interruption period.

In such cases, the plurality of solid-state light source elements disposed in the solid-state light source can be controlled to be lighted and extinguished in various manners. Accordingly, the power consumption of the solid-state light source can be precisely controlled as is needed.

Another aspect of the invention is directed to a method of controlling a projection-type display device that includes a solid-state light source, an optical modulation device that modulates light emitted from the solid-state light source, and a projection optical system that projects the light modulated by the optical modulation device on a screen. The method includes: detecting an instant interruption of a power source that is used for generating power used for driving the solid-state light source; and performing control of extinguishing the solid-state light source during at least a part of an instant interruption period until recovery after the detection of the instant interruption of the power source in a case where the instant interruption of the power source is detected in the detecting of an instant interruption of the power source.

According to the above-described method, when an instant interruption of the power source is detected in the detecting of an instant interruption of the power source, control of extinguishing the solid-state light source during at least apart of an instant interruption period until recovery after the detection of the instant interruption of the power source is performed in the performing of control of extinguishing the solid-state light source. Accordingly, the power consumption of the solid-state light source is reduced, and a period during which the solid-state light source can be lighted can be lengthened, compared to a general case.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projection-type display device according to an embodiment of the invention will be described with reference to the accompanying drawings. The embodiment described below represents some aspects of the invention, is not for the purpose of limiting the scope of the invention, and may be arbitrarily changed within the scope of the technical concept of the invention. Hereinafter, a projector as an example of the projection-type display device will be described.

Figure 1:
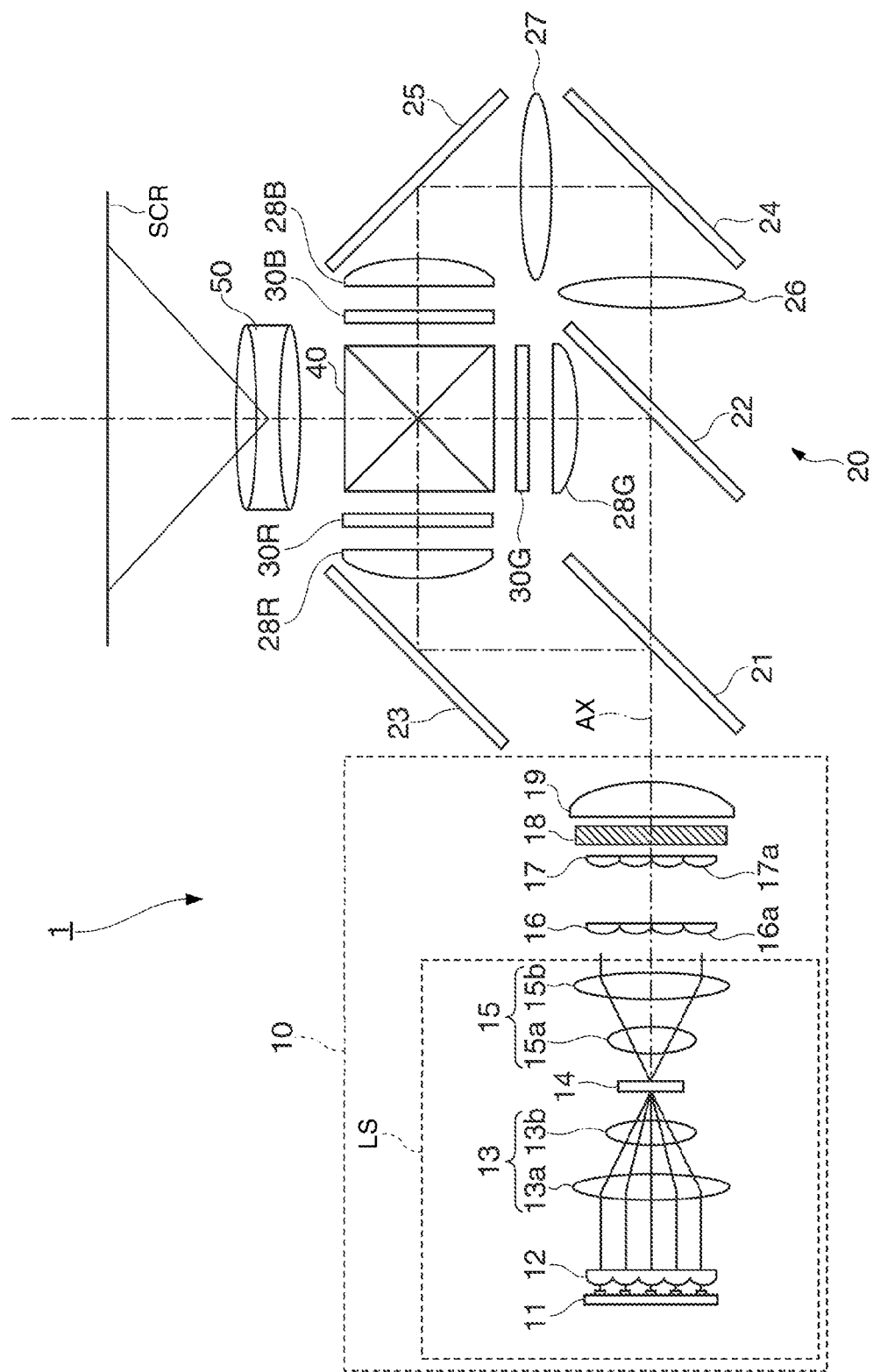
FIG. 1 is a block diagram showing the entire configuration of a projector as a projection-type display device according to an embodiment of the invention.

FIG. 1 is a block diagram showing the entire configuration of a projector as a projection-type display device according to an embodiment of the invention. As shown in FIG. 1, the projector 1 includes an illumination device 10, a color separating light guiding optical system 20, liquid crystal optical modulation devices 30R, 30G, and 30B (optical modulation devices), a cross dichroic prism 40, and a projection optical system 50. The projector 1 displays an image on a screen SCR by projecting image light according to an image signal input from the outside toward the screen SCR.

The illumination device 10 includes a light source device LS, a first lens array 16, a second lens array 17, a polarization converting device 18, and a superposing lens 19 and emits white light that includes red light, green light, and blue light. The light source device LS includes a solid-state light source array 11 (solid-state light source), a collimator lens array 12, a light collecting optical system 13, a fluorescence generating unit 14, and a collimator optical system 15 and emits white light as a whole.

Figure 2:
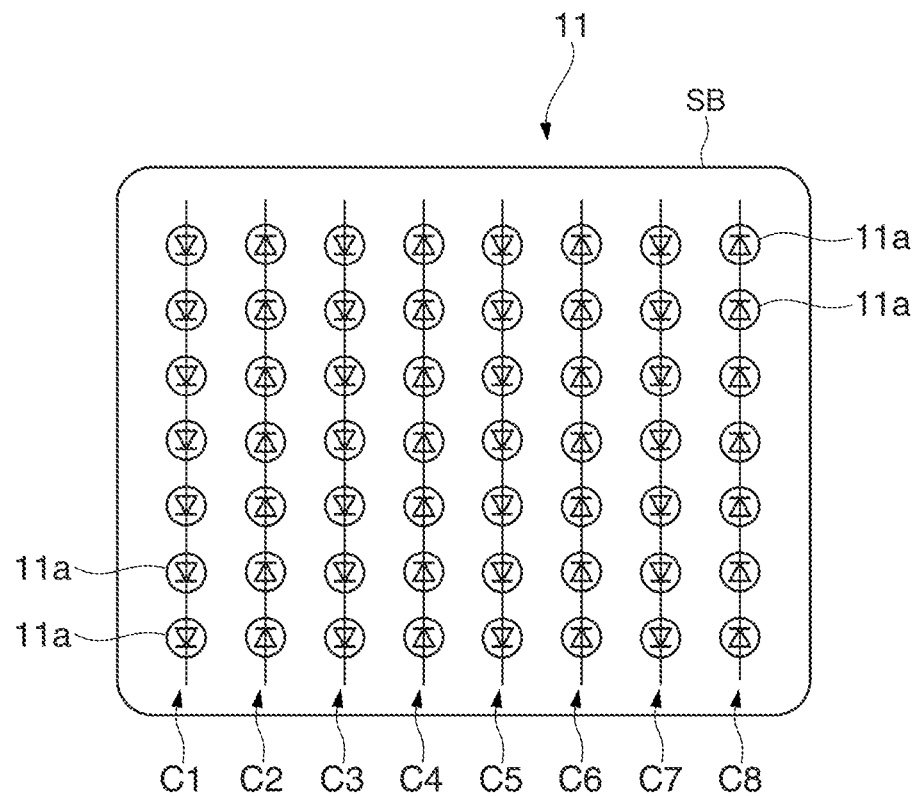
FIG. 2 is a diagram schematically showing a solid-state light source array included in a projector.

FIG. 2 is a diagram schematically showing a solid-state light source array included in a projector. As shown in FIG. 2, the solid-state light source array 11 includes a substrate SB and a plurality of solid-state light source elements 11a and is driven so as to emit blue light by a driving circuit 60 (see FIG. 3). The substrate SB is a plate-shaped member having an approximately rectangular shape on which the solid-state light source elements 11a are mounted. This substrate SB has functions of relaying the power supply to the solid-state light source elements 11a and discharging heat generated from the solid-state light source elements 11a.

The solid-state light source elements 11a are semiconductor laser devices that emit blue light (peak emission intensity: about 460 nm) and are arranged on the substrate SB in a matrix pattern. In the example shown in FIG. 2, 56 solid-state light source elements 11a are arranged on the substrate SB in a matrix pattern of 7 rows and 8 columns, and the solid-state light source elements 11a arranged in the same row are connected in series. In other words, eight solid-state light source elements 11a arranged in a row to which a sign C1 is assigned are connected in series, and eight solid-state light source elements 11a arranged in a row to which a sign C2 is assigned are connected in series. The solid-state light source elements 11a arranged in rows to which signs C3 to C8 are assigned are similarly connected respectively.

The solid-state light source array 11 shown in FIG. 2 can control lighting and extinguishing of the 56 solid-state light source elements 11a arranged on the substrate SB in units of eight solid-state light source elements 11a (eight solid-state light sources elements 11a connected in series) arranged in each of the rows C1 to C8. It is apparent that, by changing a current flowing through the solid-state light source elements 11a arranged in each of the rows C1 to C8, the intensity of emitted blue light can be continuously changed. Even when the solid-state light source elements 11a are extinguished once, by supplying a predetermined current thereto, the solid-state light source element 11a can be instantly relighted. In this embodiment, an example is described in which 56 solid-state light source elements 11a are arranged in a matrix pattern of 7 rows and 8 columns, and the solid-state light source elements 11a arranged in the same row are connected in series. However, the total number, the method of arrangement, and the method of connection of the solid-state light source elements 11a are arbitrary.

The collimator lens array 12 includes a plurality of collimator lenses corresponding to the plurality of solid-state light source elements 11a disposed in the solid-state light source array 11 and approximately parallelizes the blue light emitted from each solid-state light source element 11a. To be more specific, the collimator lens array 12 is formed by arranging the collimator lenses that are 56 plane convex lenses in a matrix pattern of 7 rows and 8 columns. This collimator lens array 12 is arranged such that the convex face of the collimator lens faces the solid-state light source array 11, and the collimator lenses are in correspondence with the solid-state light source elements 11a.

The light collecting optical system 13 includes a first lens 13a and a second lens 13b and collects the blue light that is approximately parallelized by the collimator lens array 12 at a position near the fluorescence generating unit 14. The first lens 13a and the second lens 13b are configured by biconvex lenses. In addition, lenses other than the biconvex lenses can be used as the first lens 13a and the second lens 13b as long as they can collect the blue light emitted from the collimator lens array 12 to a position near the fluorescence generating unit 14. Here, the number of lenses configuring the light collecting optical system 13 may be one, or three or more.

The fluorescence generating unit 14 is disposed near a light collecting position of the light collecting optical system 13 and includes a fluorescent layer (not shown in the figure) that generates fluorescence including red light and green light from a part of the blue light collected by the light collecting optical system 13 and a transparent member (not shown in the figure) that supports the fluorescent layer. To be more specific, the fluorescence generating unit 14 is disposed at a position at which the blue light collected by the light collecting optical system 13 is incident to the fluorescent layer in a defocused state. The fluorescence generating unit 14 emits light that includes blue light passing through the fluorescent layer without being related to generation of the fluorescence together with the fluorescence and is white light as a whole.

The above-described fluorescent layer is formed from a layer that contains $(Y,Gd)_3(Al,Ga)_5O_{12}$:Ce as a YAG-based fluorescent body. The fluorescent layer may be formed from a layer that contains a YAG-based fluorescent body other than $(Y,Gd)_3(Al,Ga)_5O_{12}$:Ce, a layer that contains silicate-based fluorescent body, or a layer that contains a TAG-based fluorescent body. Furthermore, the fluorescent layer may be formed from a layer that contains a mixture of a fluorescent body (for example, a $CaAlSiN_3$ red fluorescent body) converting main excitation light into red light and a fluorescent body (for example, a β sialon green fluorescent body) converting the main excitation light into green light.

The fluorescent layer converts a part of the blue light collected by the light collecting optical system 13 into fluorescence including red light (peak of the emission intensity: about 610 nm) and green light (peak of the emission intensity: about 550 nm) and emits the converted fluorescence. A part of the blue light passing through the fluorescent layer without being related to generation of fluorescence is emitted together with the fluorescence. At this time, since the blue light is scattered or reflected within the fluorescent layer, the blue light is emitted from the fluorescent layer as light having the almost same distribution (a so-called Lambertian distribution) characteristics as the fluorescence. Here, the transparent member that supports the fluorescent layer, for example, may be formed of quartz glass or optical glass, and a layer (so-called dichroic coat) that transmits excitation light and reflects fluorescence may be formed on the light collecting optical system 13 side of the fluorescent layer.

The collimator optical system 15 includes a first lens 15a and a second lens 15b and approximately parallelizes the light output from the fluorescence generating unit 14. The first lens 15a and the second lens 15b are formed of biconvex lenses. As the first lens 15a and the second lens 15b, lenses other than the biconvex lenses can be used as long as the lenses can approximately parallelize the light output from the fluorescence generating unit 14. Furthermore, the number of the lenses configuring the collimator optical system 15 may be one, or three or more.

The first lens array 16 includes a plurality of small lenses 16a and divides the light emitted from the light source device LS into a plurality of partial luminous fluxes. To be more specific, the plurality of small lenses 16a included in the first lens array 16 is arranged in a matrix shape that extends in a plurality of rows and a plurality of columns within a plane perpendicular to an illumination optical axis AX. The outer shape of the plurality of small lenses 16a included in the first lens array 16 is approximately similar to the outer shape of the image forming areas of the liquid crystal optical modulation devices 30R, 30G, and 30B.

The second lens array 17 has a plurality of small lenses 17a corresponding to the plurality of small lenses 16a disposed in the first lens array 16. In other words, the plurality of small lenses 17a included in the second lens array 17, similarly to the plurality of small lenses 16a included in the first lens array 16, is arranged in a matrix shape extending in a plurality of rows and a plurality of columns within a plane perpendicular to the illumination optical axis AX. This second lens array 17, together with the superposing lens 19, forms images of the small lenses 16a included in the first lens array 16 near the image forming areas of the liquid crystal optical modulation devices 30R, 30G, and 30B.

The polarization converting device 18 has a polarization separating layer, a reflection layer, and a retardation film (all of them are not shown in the figure). The polarization converting device 18 outputs the partial luminous fluxes divided by the first lens array 16 as linear polarized light of approximately one type of which the polarization direction is uniform. Here, the polarization separating layer directly transmits one linear polarized component out of polarized components included in the light output from the light source device LS and reflects the other linear polarized component in a direction perpendicular to the illumination optical axis AX. In addition, the reflection layer reflects the other linear polarized component reflected by the polarization separating layer in a direction parallel to the illumination optical axis AX. Furthermore, the retardation film converts the other linear polarized component reflected by the reflection layer into the one linear polarized component.

The superposing lens 19 is disposed such that the optical axis thereof coincides with the optical axis of the illumination device 10. The superposing lens 19 collects the partial luminous fluxes output from the polarization converting device 18 and overlaps the partial luminous fluxes at a position near the image forming areas of the liquid crystal optical modulation devices 30R, 30G, and 30B. Here, the superposing lens 19 may be configured by one lens or a composite lens acquired by combining a plurality of lenses. The first lens array 16, the second lens array 17, and the superposing lens 19 described above configure a lens integrator optical system that uniformizes the light output from the light source device LS. Furthermore, instead of the lens integrator optical system, a rod integrator optical system including an integrator rod can be used.

The color separation light guiding optical system 20 includes dichroic mirrors 21 and 22, reflection mirrors 23 to 25, relay lenses 26 and 27, and light collecting lenses 28R, 28G, and 28B. The color separation light guiding optical system 20 separates the light emitted from the illumination device 10 into red light, green light, and blue light and guides the separated light respectively to the liquid crystal optical modulation devices 30R, 30G, and 30B. Each of the dichroic mirrors 21 and 22 is a mirror in which a wavelength selecting transmission film that reflects light of a predetermined wavelength region and passes light of other wavelength regions is formed on a transparent substrate. To be more specific, the dichroic mirror 21 reflects a red light component and transmits a green light component and a blue light component, and the dichroic mirror 22 reflects the green light component and transmits the blue light component.

The reflection mirror 23 is a mirror that reflects the red light component, and the reflection mirrors 24 and 25 are mirrors that reflect the blue light component. The relay lens 26 is disposed between the dichroic mirror 22 and the reflection mirror 24, and the relay lens 27 is disposed between the reflection mirror 24 and the reflection mirror 25. Since the length of the optical path of the blue light is longer than those of the optical paths of other color light, the relay lenses 26 and 27 are disposed so as to prevent a decrease in the use efficiency of light due to radiation of light or the like. The light collecting lenses 28R, 28G, and 28B collect the red light component reflected by the reflection mirror 23, the green light component reflected by the dichroic mirror 22, and the blue light component reflected by the reflection mirror 25 at the image forming areas of the liquid crystal optical modulation devices 30R, 30G, and 30B.

The red light reflected by the dichroic mirror 21 is reflected by the reflection mirror 23 and is incident to the image forming area of the liquid crystal optical modulation device 30R for red light through the light collecting lens 28R. The green light passing through the dichroic mirror 21 is reflected by the dichroic mirror 22 and is incident to the image forming area of the liquid crystal optical modulation device 30G for green light through the light collecting lens 28G. The blue light passing through the dichroic mirrors 21 and 22 is incident to the image forming area of the liquid crystal optical modulation device 30B for blue light sequentially through the relay lens 26, the reflection mirror 24, the relay lens 27, the reflection mirror 25, and the light collecting lens 28B.

The liquid crystal optical modulation devices 30R, 30G, and 30B generate red image light, green image light, and blue image light by modulating the incident color light in accordance with an image signal input from the outside. Although not shown in FIG. 1, incident-side polarizing plates are interposed between the light collecting lenses 28R, 28G, and 28B and the liquid crystal optical modulation devices 30R, 30G, and 30B, and incident-side polarizing plates are interposed between the liquid crystal optical modulation devices 30R, 30G, and 30B and the cross dichroic prism 40.

Each of the liquid crystal optical modulation devices 30R, 30G, and 30B is a liquid crystal optical modulation device of a transmissive type that is acquired by tightly sealing a liquid crystal as an electrooptic material between transparent glass substrates forming one pair and, for example, includes a polysilicon TFT (Thin Film Transistor) as a switching element. By modulating the polarization direction of the color light (linear polarized light) passing through the above-described incident-side polarizing plates, which are not shown in the figure, described above in accordance with switching operations of the switching elements disposed in the liquid crystal optical modulation devices 30R, 30G, and 30B, red image light, green image light, and blue image light according to an image signal are generated.

The cross dichroic prism 40 forms a color image by composing the image light output from the above-described outgoing-side polarizing plates not shown in the figure. To be more specific, the cross dichroic prism 40 is an optical member having an approximate cube shape that is formed by bonding four rectangular prisms. In addition, on the boundary faces that are acquired by bonding the rectangular prisms and have an approximately "X" shape, dielectric multi-layer films are formed. The dielectric multi-layer film formed on one boundary having an approximate "X" shape reflects red light, and the dielectric multi-layer film formed on the other boundary face reflects blue light. The red light and the blue light are bent by the dielectric multi-layer films so as to be aligned in the traveling direction of the green light, whereby the three types of color light are composed. The projection optical system 50 projects a color image composed by the cross dichroic prism 40 toward the screen SCR in an enlarged scale.

Figure 3:
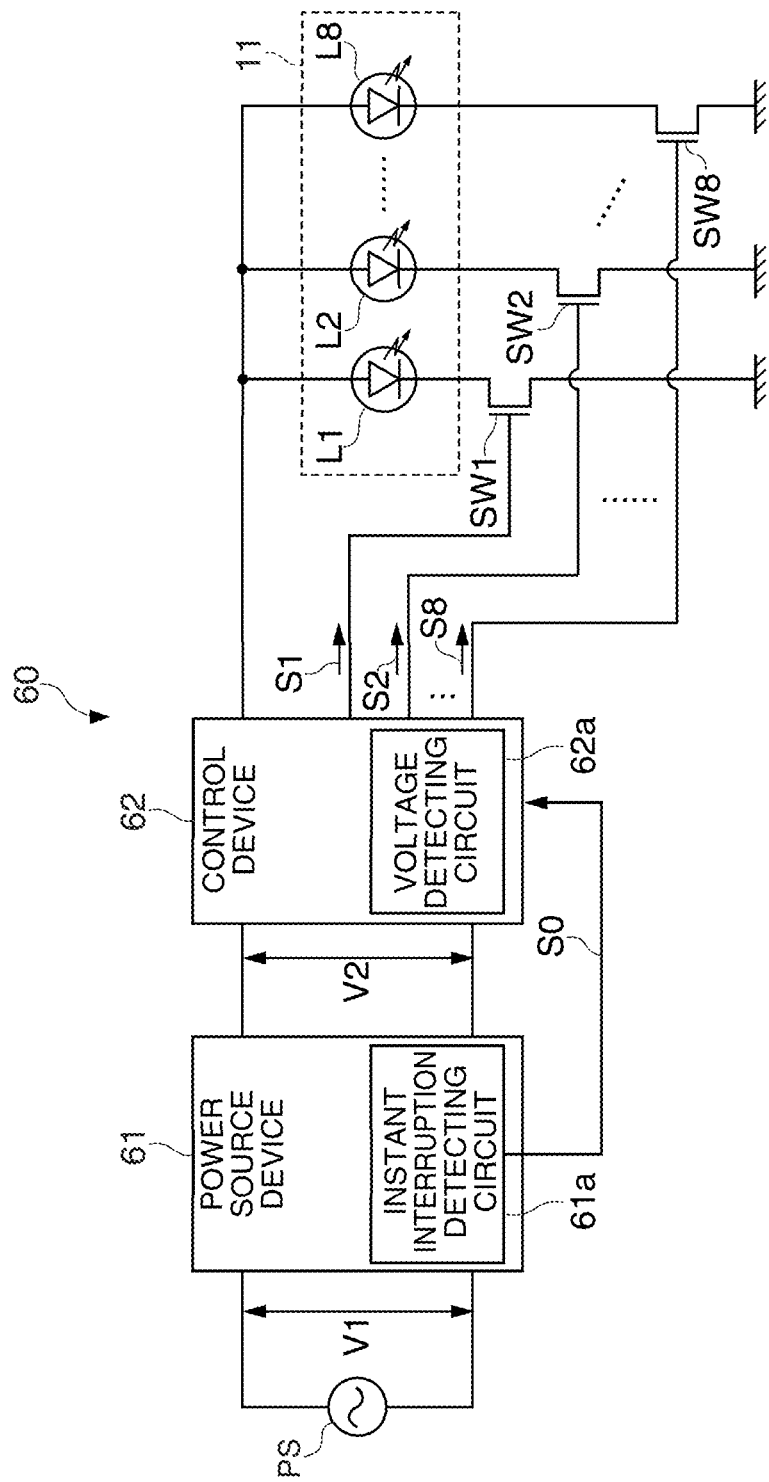
FIG. 3 is a block diagram showing the configuration of a main part of a driving circuit of a light source device included in a projector.

Next, a driving circuit that drives the light source device LS will be described. FIG. 3 is a block diagram showing the configuration of a main part of the driving circuit of the light source device included in a projector. As shown in FIG. 3, the driving circuit 60 of the light source device LS includes a power source device 61 and a control device 62. The driving circuit 60 performs driving control of the solid-state light source array 11 included in the light source device LS by using a power source PS that is supplied from the outside. The power source PS supplied from the outside is, for example, a commercial power source of which the voltage V1 is 100 V.

Here, for simplification of the description for FIG. 3, the plurality of solid-state light source elements 11a included in the solid-state light source array 11 is shown as solid-state light source elements L1 to L8 in units of eight elements connected in series. In other words, eight solid-state light source elements 11a that are arranged in a row C1 shown in FIG. 2 and are connected in series are shown as the solid-state light source element L1, and eight solid-state light source elements 11a that are arranged in a row C2 shown in FIG. 2 and are connected in series are shown as the solid-state light source element L2. Similarly, the solid-state light source elements 11a that are respectively arranged in rows C3 to C8 shown in FIG. 2 and are connected in series are respectively shown as the solid-state light source elements L3 to L8.

To the cathodes of the solid-state light source elements L1 to L8, switching elements SW1 to SW8 of which the On state and the Off state are controlled by the control device 62 are connected. As the switching elements SW1 to SW8, for example, FETs (Field Effect Transistors) can be used. Such switching elements SW1 to SW8 are disposed so as to control the lighting and extinguishing of the solid-state light source elements L1 to L8. In other words, when the switching elements SW1 to SW8 are in the On states in accordance with control of the control device 62, the solid-state light source elements L1 to L8 are in the lighted state. On the other hand, when the switching elements SW1 to SW8 are in the Off states, the solid-state light source elements L1 to L8 are in the extinguished state.

Since the On states and Off states of the switching elements SW1 to SW8 can be individually controlled, the lighting and extinguishing control can be performed for each of the solid-state light source elements L1 to L8. In addition, amounts of currents supplied to the solid-state light source elements L1 to L8 when the switching elements SW1 to SW8 are in the On states can be controlled. By controlling the amounts of currents supplied to the solid-state light source elements L1 to L8, the light intensity of the blue light emitted from the solid-state light source array 11 can be changed.

The power source device 61 generates power (for example, a DC power of which the voltage V2 is 380V) used for driving the solid-state light source array 11 and supplies the generated power to the control device 62 by using power supplied from the power source PS. In this power source device 61, an instant interruption detecting circuit 61a (instant interruption detecting device) that detects an instant interruption of the power source PS, and a detection signal S0 that represents a detection result of the instant interruption detecting circuit 61a is output to the control device 62. Although an example is described here in which the instant interruption detecting circuit 61a is disposed inside the power source device 61, the instant interruption detecting circuit 61a may be disposed outside the power source device 61.

In addition, although not shown in FIG. 3, a PFC (Power Factor Correction) circuit and a capacitor that stores power used for maintaining the lighting of the solid-state light source array 11 in a case where an instant interruption occurs are disposed in the power source device 61. The capacitor that is disposed in the power source device 61 is set to have capacitance for which the lighting of the solid-state light source array 11 can be maintained, for example, during 0.5 seconds after the occurrence of the instant interruption, in consideration of disadvantages of increases in the size and cost of the power source device 61 according to an increase in the capacitance thereof.

The control device 62 includes a voltage detecting circuit 62a that detects an output voltage (voltage V2) of the power source device 61 and controls the driving of the solid-state light source array 11 by using the power supplied from the power source device 61. To be more specific, the control device 62 controls the On states and Off states of the switching elements SW1 to SW8 by outputting control signals S1 to S8 to the switching elements SW1 to SW8 connected to the solid-state light source elements L1 to L8 of the solid-state light source array 11, thereby individually controlling the lighting and extinguishing of the solid-state light source elements L1 to L8. In addition, the control device 62 controls the amounts of currents supplied to the solid-state light source elements L1 to L8, thereby controlling the light intensity of the blue light emitted from the solid-state light source array 11.

In a case where a detection signal S0 is output from the instant interruption detecting circuit 61a or in a case where the detection signal S0 is output and the voltage value detected by the voltage detecting circuit 62a is less than a threshold voltage Vt set in advance, the control device 62 performs control for lengthening the time at which the solid-state light source array 11 can be lighted for reducing the power consumption of the solid-state light source array 11. As described above, the capacitance of the capacitor (a capacitor that stores the power used for maintaining the lighting of the solid-state light source array 11 in a case where an instant interruption occurs) disposed in the power source device 61 is decreased in consideration of the disadvantages accompanied with an increase in the capacitance. Accordingly, even in a case where a capacitor having low capacitance is disposed in the power source device 61, in order to lengthen the time for which the solid-state light source array 11 can be lighted as much as possible, the control device 62 performs control of decreasing the power consumption of the solid-state light source array 11.

To be more specific, during a period until an instant interruption is recovered after the input of the detection signal S0 representing the instant interruption of the power source PS, the control device 62 performs control of extinguishing the solid-state light source array 11. Here, since the solid-state light source array 11 includes a plurality of solid-state light source elements L1 to L8, the lighting and extinguishing of the solid-state light source elements L1 to L8 can be individually controlled by the control device 62. Accordingly, although various methods may be considered to be used as the method of controlling the solid-state light source elements L1 to L8 using the control device 62, for example, control methods represented in (1) to (6) shown below can be used.

(1) Entire Intermittent Extinguishing Control

This is a control method in which all the solid-state light source elements L1 to L8 are intermittently extinguished at a specific timing. To be more specific, in the above-described control method, the control device 62 outputs the control signals S1 to S8 to the switching elements SW1 to SW8 at the specific timing so as to allow all the switching elements SW1 to SW8 to be sequentially in the On state and the Off state at the specific timing, thereby repeating lighting and extinguishing of the solid-state light source elements L1 to L8.

(2) Entire Intermittent Extinguishing PWM Control

This is a method in which a period, during which all the solid-state light source elements L1 to L8 are intermittently extinguished, is PWM-controlled. To be more specific, in the above-described control method, similarly to "(1) Entire Intermittent Extinguishing PWM Control" described above, although the control device 62 performs control such that all the solid-state light source elements L1 to L8 are intermittently extinguished at the same timing, the length of the period during which the solid-state light source elements L1 to L8 are intermittently extinguished is changed (to be longer) in accordance with an elapse of time after the occurrence of an instant interruption.

(3) Partial Intermittent Extinguishing Control

This is a method in which only a part of the solid-state light source elements L1 to L8 is intermittently extinguished at a specific timing. To be more specific, in the above-described control method, the control device 62 outputs control signals to only apart of the switching elements SW1 to SW8 at a specific timing so as to allow the switching elements, to which the control signals are output, to be sequentially in the On state and the Off state at a specific timing, thereby repeating lighting and extinguishing of only a part of the solid-state light source elements L1 to L8.

(4) Partial Intermittent Extinguishing PWM Control

This is a method in which a period, during which only a part of the solid-state light source elements L1 to L8 is intermittently extinguished, is PWM-controlled. To be more specific, in the above-described control method, similarly to "(3) Partial Intermittent Extinguishing Control" described above, although the control device 62 performs control such that only a part of the solid-state light source elements L1 to L8 is intermittently extinguished at the same timing, the length of the period during which a part of the solid-state light source elements L1 to L8 is intermittently extinguished is changed (to be longer) in accordance with an elapse of time after the occurrence of an instant interruption.

(5) Entire Extinguishing Control

This is a method in which all the solid-state light source elements L1 to L8 are extinguished over the entirety of the instant interruption period. To be more specific, in the above-described control method, at a time point when the detection signal S0 is input, the control device 62 outputs the control signals S1 to S8 to the switching elements SW1 to SW8 so as to allow all the switching elements SW1 to SW8 to be in the Off state, thereby the solid-state light source elements L1 to L8 are extinguished over the entirety of the instant interruption period.

(6) Partial Extinguishing Control

This is a method in which only a part of the solid-state light source elements L1 to L8 is extinguished over the entirety of the instant interruption period. To be more specific, in the above-described control method, at a time point when the detection signal S0 is input, the control device 62 outputs the control signals only to a part of the switching elements SW1 to SW8 so as to allow the switching elements, to which the control signals are input, to be in the Off state, and thereby only a part of the solid-state light source elements L1 to L8 is extinguished over the entirety of the instant interruption period.

In addition, the control methods presented in (1) to (4) and (5) described above may be combined or modified for a more precise control operation. For example, the control method disclosed in (3) or (4) and the control method disclosed in (6) may be combined such that, over the entirety of the instant interruption period, a part of the solid-state light source elements L1 to L8 is extinguished, and the remaining part is controlled to be intermittently extinguished. Furthermore, by modifying the control method disclosed in (6) described above, the solid-state light source element to be extinguished out of the solid-state light source elements L1 to L8 may be controlled so as to be sequentially changed. For example, there is a method in which the solid-state light source elements L1 to L8 are sequentially extinguished in the mentioned order in accordance with an elapse of time, and the solid-state light source elements 11a out of 56 solid-state light source elements 11a disposed in the solid-state light source array 11 are sequentially extinguished in units of eight solid-state light source elements. In addition, the amounts of currents supplied to the solid-state light source elements L1 to L8 may be controlled in addition to using the control methods disclosed in (1) to (4) and (5) described above.

Figure 4:
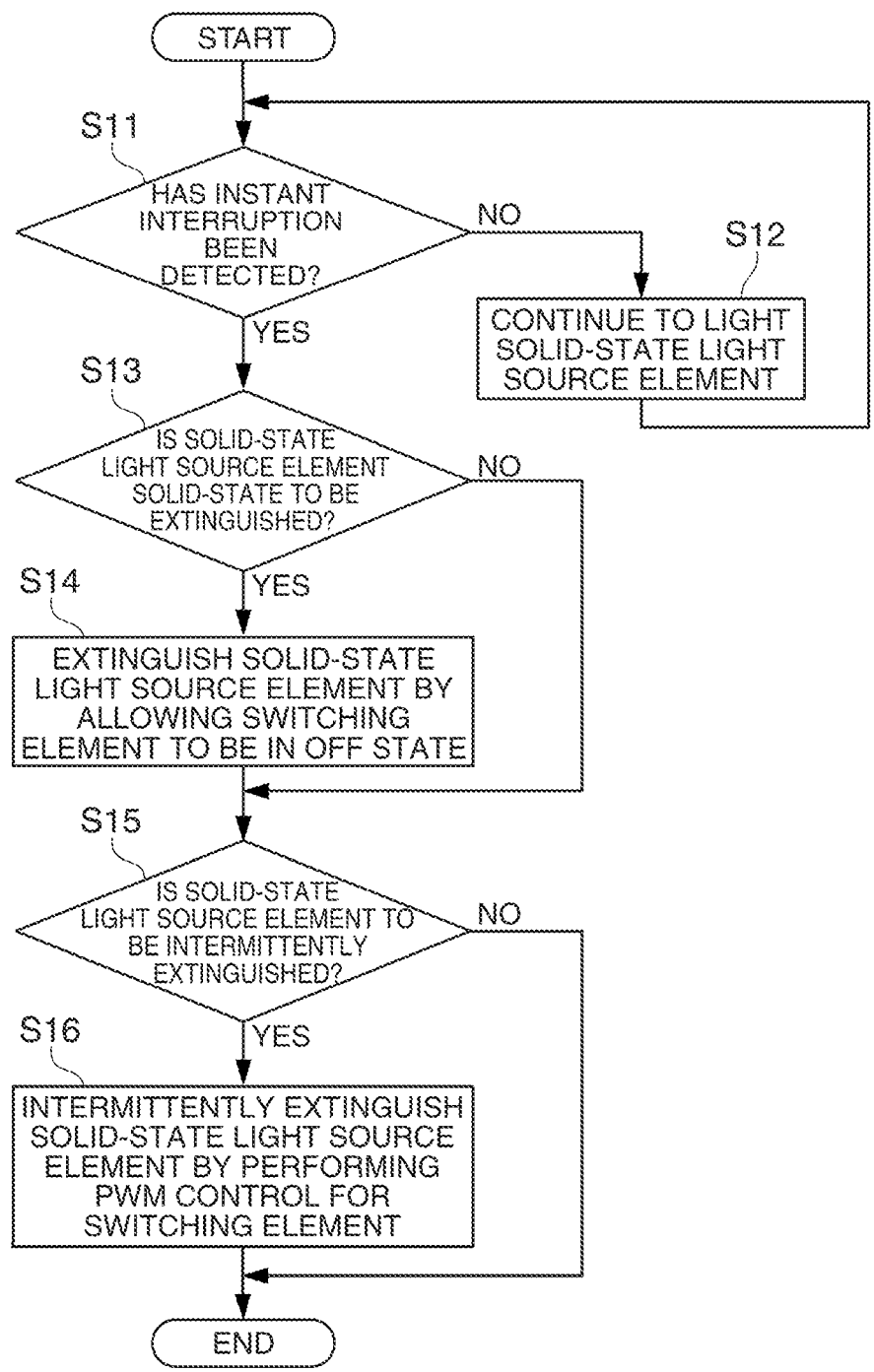
FIG. 4 is a flowchart showing the overview of an operation performed by a projector when an instant interruption occurs.

Next, the operation of the projector 1 having the above-described configuration will be described. FIG. 4 is a flowchart showing the overview of an operation performed by a projector when an instant interruption occurs. The flowchart shown in FIG. 4 is a flowchart in a case where a control process combining the control method disclosed in (4) and the control method disclosed in (6), which are described above, is performed by the control device 62. The process shown in this flowchart is started as the control signals S1 to S8 are output from the control device 62 disposed in the driving circuit 60, and the switching elements SW1 to SW8 are in the On state so as to allow the light source device LS to be in the operating state (the solid-state light source elements L1 to L8 are lighted).

First, it is determined whether or not an instant interruption of the power source PS is detected by the control device 62 disposed in the driving circuit 60 (Step S11: detection step). To be more specific, it is determined whether or not a detection signal S0 indicating the detection of an instant interruption is output from the instant interruption detecting circuit 61a by the control device 62. In a case where it is determined that an instant interruption has not been detected (in a case where the determination result is "No"), the control device 62 maintains the switching elements SW1 to SW8 in the On state and supplies a constant current to the solid-state light source elements L1 to L8, thereby allowing the solid-state light source elements L1 to L8 to continue to be lighted (Step S12).

On the other hand, in a case where an instant interruption is detected (in a case where the determination result of Step S11 is "Yes"), the control device 62 determines whether or not each of the solid-state light source elements L1 to L8 is a solid-state light source element to be extinguished (Step S13). Here, for example, assuming that the solid-state light source elements L1 to L3 are set in advance as solid-state light source elements to be extinguished, the control device 62 outputs control signals S1 to S3 so as to allow the switching elements SW1 to SW3 connected to the solid-state light source elements L1 to L3 to be in the Off state, thereby extinguishing the solid-state light source elements L1 to L3 (Step S14: control step).

Next, the control device 62 determines whether each of the solid-state light source elements L1 to L8 is a solid-state light source element to be intermittently extinguished (Step S15). Here, for example, assuming that the solid-state light source elements L4 to L6 are set in advance as the solid-state light source elements to be intermittently extinguished, the control device 62 performs PWM control for the switching elements SW4 to SW6 connected to the solid-state light source elements L4 to L6 so as to intermittently extinguish the solid-state light source elements L4 to L6 (Step S16: Control Step).

By the above-described control process, the "partial extinguishing control" is performed for three solid-state light source elements L1 to L3 out of the solid-state light source elements L1 to L8, and the "partial intermittent extinguishing PWM control" is performed for three solid-state light source elements L4 to L6. In addition, a constant current is supplied to the remaining two solid-state light source elements L7 and L8 from the control device 62, so that the two solid-state light source elements L7 and L8 continue to be lighted. As above, when an instant interruption occurs, the "partial extinguishing control", the "partial intermittent extinguishing PWM control", or the like are performed for the solid-state light source elements L1 to L8. Therefore, the power consumption of the solid-state light source array 11 is decreased, and the period during which the solid-state light source array 11 can be lighted can be longer than that of a general case.

In a case where any of the control processes disclosed in (1) to (4) described above is performed by the control device 62, the determination result of Step S13 is "No", and the determination result of Step S15 is "Yes". Accordingly, the intermittent extinguishing control process or the intermittent extinguishing PWM control is performed for all or a part of the solid-state light source elements L1 to L8 in Step S16. On the other hand, in a case where any of the control processes disclosed in (5) and (6) described above is performed by the control device 62, the determination result of Step S13 is "Yes", and the determination result of Step S15 is "No". Therefore, the extinguishing control process is performed for all or a part of the solid-state light source elements L1 to L8 in Step S14.

Figure 5:
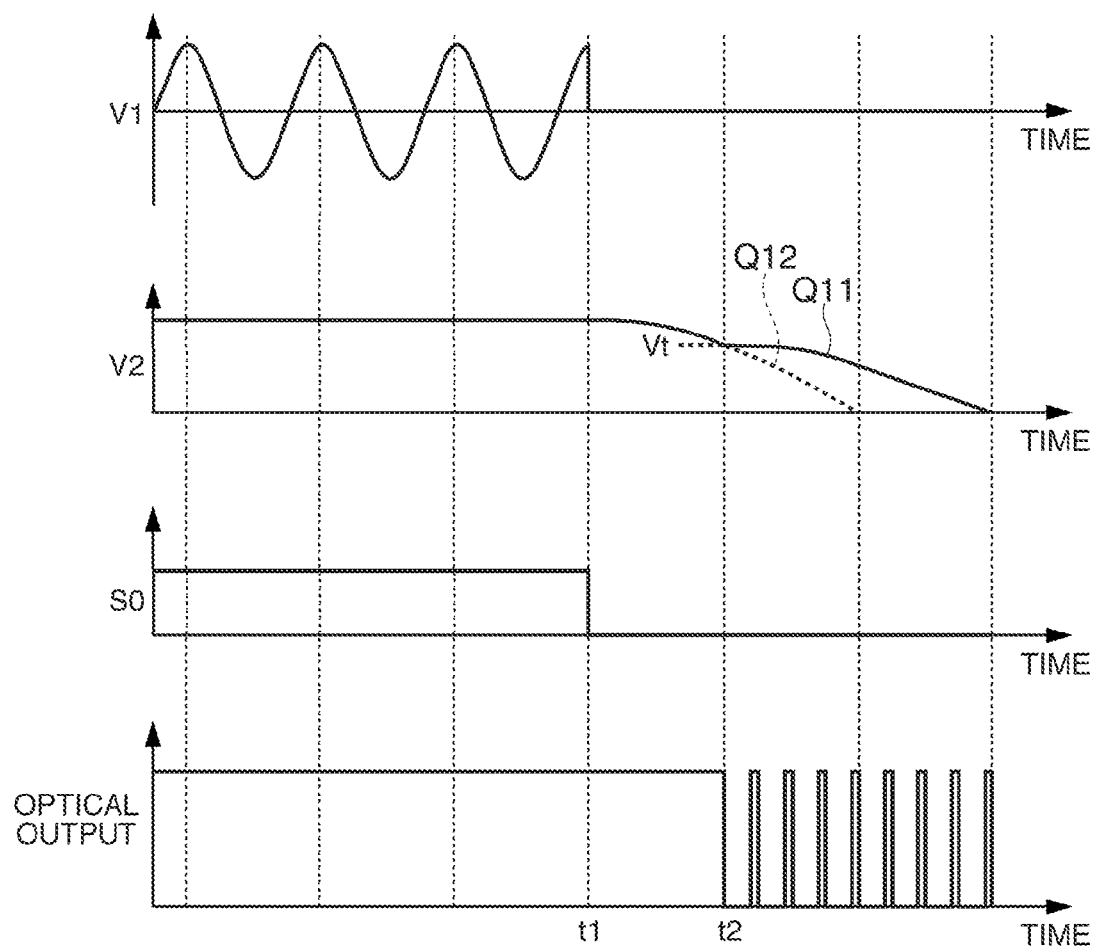
FIG. 5 is a diagram showing an example of a change in the optical output of a light source device included in a projector when an instant interruption occurs.
Figure 6:
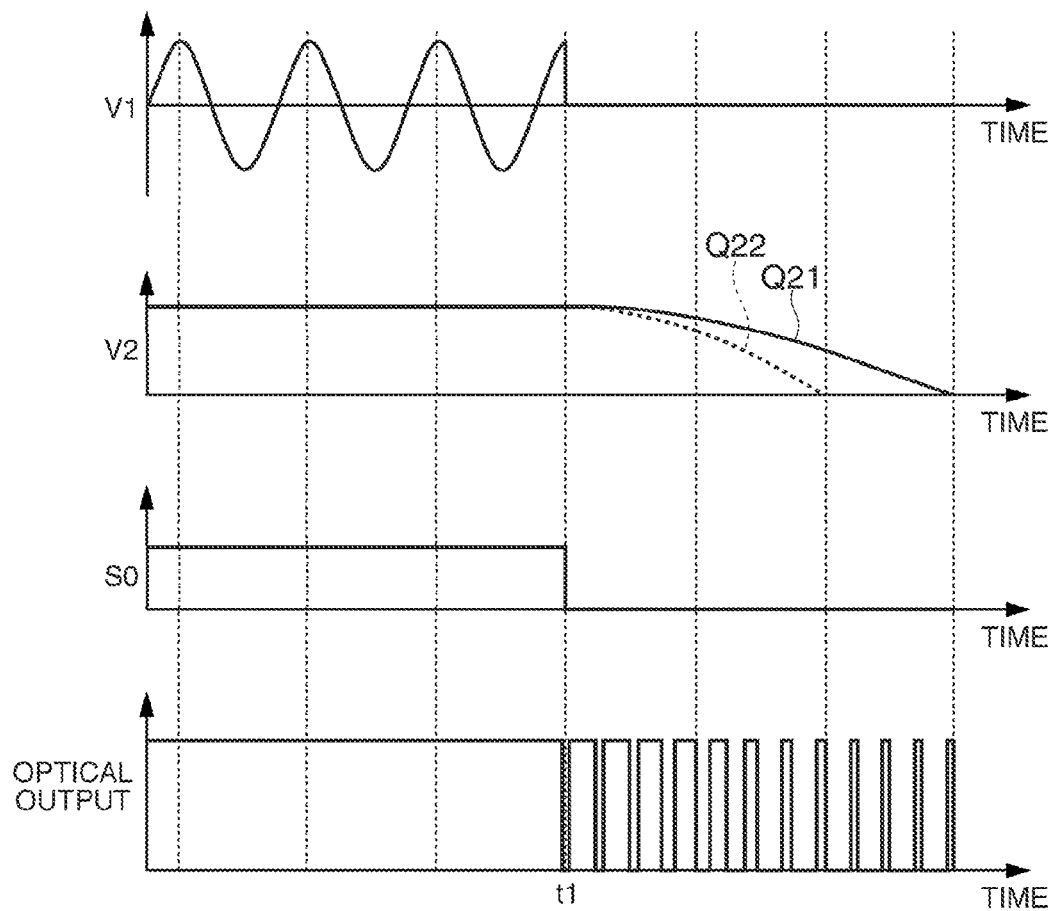
FIG. 6 is a diagram showing another example of a change in the optical output of a light source device included in a projector when an instant interruption occurs.
Figure 7:
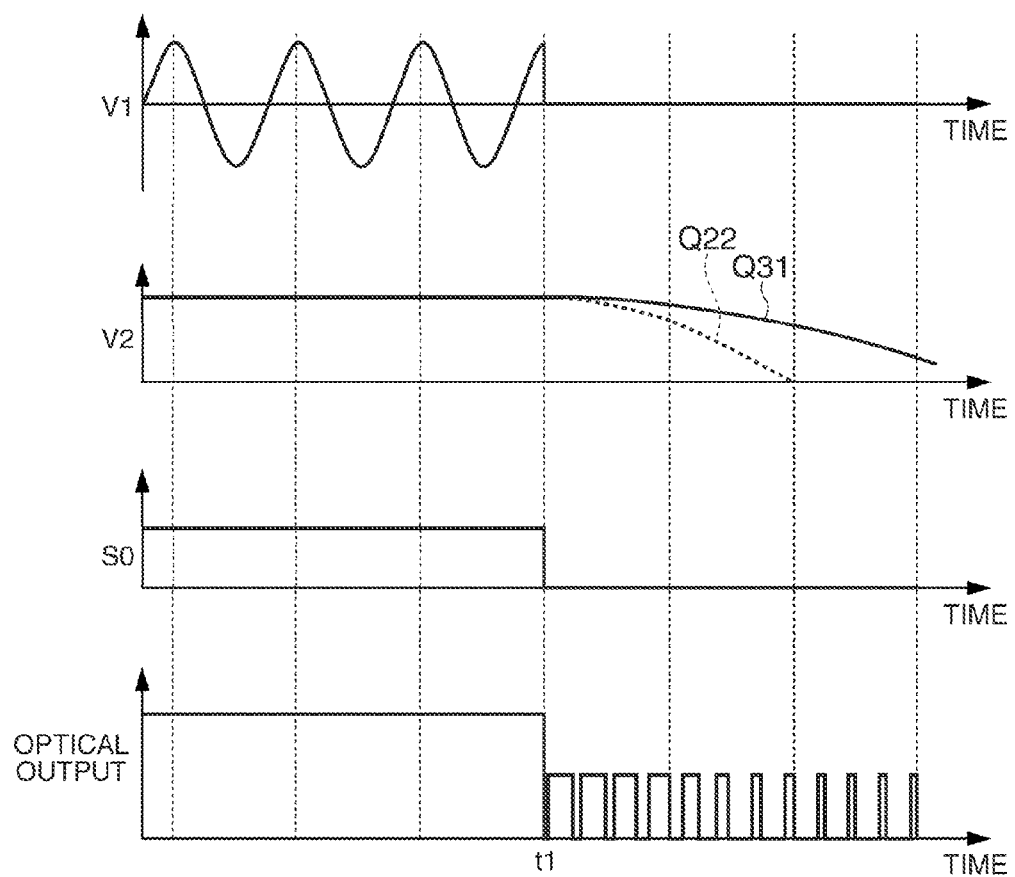
FIG. 7 is a diagram showing yet another example of a change in the optical output of a light source device included in a projector when an instant interruption occurs.

Next, several examples of a change (intensity change in blue light) in the optical output of the light source device LS at the time of occurrence of an instant interruption of the power source PS will be described. FIGS. 5 to 7 are diagrams showing examples of the change in the optical output of the light source device included in a projector when an instant interruption occurs. FIG. 5 is a diagram showing a change in the optical output of the light source device LS when the "entire intermittent extinguishing control" disclosed in (1) described above is performed. FIG. 6 is a diagram showing a change in the optical output of the light source device LS when the "entire intermittent extinguishing PWM control" disclosed in (2) described above is performed. FIG. 7 is a diagram showing a change in the optical output of the light source device LS when a control process combining the "entire intermittent extinguishing PWM control" disclosed in (2) described above and a control process of the amounts of currents supplied to the solid-state light source elements L1 to L8 is performed.

First, the example shown in FIG. 5 will be described. In this example, the "entire intermittent extinguishing control" is performed by using the detection result of the voltage detecting circuit 62a, in addition to the detection result of the instant interruption detecting circuit 61a shown in FIG. 3. As shown in FIG. 5, when an instant interruption of the power source PS occurs at time t1, the detection signal S0 output from the instant interruption detecting circuit 61a changes from the H (high) level to the L (low) level. When the detection signal S0 changes to the L level, it is determined whether the detection voltage of the voltage detecting circuit 62a (that is, the output voltage V2 of the power source device 61) is lower than the threshold voltage Vt set in advance by the control device 62.

In a case where the detection voltage of the voltage detecting circuit 62a is not lower than the threshold voltage Vt, the solid-state light source elements L1 to L8 continue to be lighted. Accordingly, the power accumulated in a capacitor, which is not shown in the figure, disposed in the power source device 61 is slowly consumed, and the output voltage V2 of the power source device 61 is slowly lowered. Now, as shown in FIG. 5, it is assumed that the detection voltage of the voltage detecting circuit 62a at time t2 is lower than the threshold voltage Vt. Then, the control device 62 performs the "entire intermittent extinguishing control", and accordingly, all the solid-state light source elements L1 to L8 are intermittently extinguished at a specific timing.

By intermittently extinguishing the solid-state power source elements L1 to L8, the power consumption is reduced, and, as denoted by a curve to which a reference sign Q11 is assigned, the rate of decrease in the output voltage V2 is gentle. In FIG. 5, a curve to which a reference sign Q12 is assigned is a curve that represents a change in the output voltage V2 in a case where the solid-state light source elements L1 to L8 continue to be lighted also after time t2. As above, by performing the "entire intermittent extinguishing control" by using the control device 62, the period (a period until the output voltage V2 becomes zero) during which the solid-state light source array 11 can be lighted can be lengthened.

Next, the example shown in FIG. 6 will be described. As shown in FIG. 6, when an instant interruption of the power source PS occurs at time t1, the detection signal S0 output from the instant interruption detecting circuit 61a changes from the H level to the L level. When the detection signal S0 changes to the L level, the control device 62 performs the "entire period extinguishing PWM control" such that the length of the period during which all the solid-state light source elements L1 to L8 are intermittently extinguished is gradually lengthened.

By intermittently extinguishing the solid-state power source elements L1 to L8, the power consumption is reduced, and, as denoted by a curve to which a reference sign Q21 is assigned, the rate of decrease in the output voltage V2 is gentle. In FIG. 6, a curve to which a reference sign Q22 is assigned is a curve that represents a change in the output voltage V2 in a case where the solid-state light source elements L1 to L8 continue to be lighted also after time t1. As above, by performing the "entire intermittent extinguishing PWM control" by using the control device 62, the period (a period until the output voltage V2 becomes zero) during which the solid-state light source array 11 can be lighted can be lengthened.

Next, the example shown in FIG. 7 will be described. In the example shown in FIG. 7, similarly to the example shown in FIG. 6, after time t1 when an instant interruption of the power source PS occurs, the control device 62 performs the "entire period extinguishing PWM control". In addition, in the example shown in FIG. 7, the amount of currents supplied to the solid-state light source elements L1 to L8 during the period in which the solid-state light source elements L1 to L8 are lighted is decreased. Accordingly, after time t1, the optical output of the light source device LS is lowered by about a half.

By decreasing the amount of currents in addition to intermittently extinguishing the solid-state power source elements L1 to L8, the power consumption is reduced, and, as denoted by a curve to which a reference sign Q31 is assigned, the rate of decrease in the output voltage V2 becomes gentler. As above, by performing the "entire intermittent extinguishing PWM control" and the control of decreasing the amount of currents by using the control device 62, the period (a period until the output voltage V2 becomes zero) during which the solid-state light source array 11 can be lighted can be lengthened.

As above, according to this embodiment, in a case where an instant interruption of the power source PS occurs, the control device 62 performs control of extinguishing the solid-state light source array 11 during at least a part of an instant interruption period until recovery from the occurrence of the instant interruption. Therefore, according to this embodiment, the period during which the solid-state light source array 11 can be lighted can be configured to be longer than that of a general case.

Here, by extinguishing the solid-state light source array 11 over the entirety of the instant interruption period, the power consumption of the solid-state light source array 11 can be almost zero. The solid-state light source array 11 can be relighted even after being extinguished. Accordingly, by performing control of lighting the solid-state light source array 11 at an arbitrary timing by using the control device 62, the solid-state light source array 11 can be instantly relighted by the power accumulated in the capacitor of the power source device 61.

As above, although the projection-type display device and the method of controlling thereof according to one embodiment of the invention have been described, the invention is not limited to the above-described embodiments, and a change can be freely made within the scope of the invention. For example, modified examples described below can be applied.

In the above-described embodiment, a configuration has been described in which the light source device LS emitting blue light as excitation light and the fluorescence generating unit 14 converting a part of the blue light emitted from the light source device LS into red light and green light are included. However, the invention is not limited thereto. For example, a configuration may be employed in which a light source device emitting violet light or ultraviolet light as excitation light and a fluorescent layer generating color light including red light, green light, and blue light from the violet light or the ultraviolet light are included. In addition, in the above-described embodiment, an example has been described in which the illumination device 10 is configured so as to emit white light as a whole. However, the invention is not limited thereto. The illumination device 10 may be configured so as to emit light other than the white light.

In the above-described embodiment, a case has been described as an example in which the solid-state light source elements 11*a* (the solid-state light source elements L1 to L8) arranged in the solid-state light source array 11 are semiconductor laser devices. However, the invention is not limited thereto. For example, the invention can be applied to a solid-state light source array in which solid-state light source elements are light emitting diodes. In addition, in the above-described embodiment, an example has been described in which a plurality of solid-state light source devices is included. However, the invention can be applied to a case where only one solid-state light source element is included.

In the above-described embodiment, an example has been described in which semiconductor laser devices emitting blue light of which the peak of the emission intensity is about 460 nm are used as the solid-state light source elements 11*a* (the solid-state light source elements L1 to L8). However, the invention is not limited thereto. For example, semiconductor laser devices emitting blue light of which the peak of the emission intensity is in the range of 440 to 450 nm may be used as the solid-state light source elements 11*a* (the solid-state light source elements L1 to L8). By using such semiconductor laser devices, the efficiency of generating fluorescence from blue light can be improved.

In the above-described embodiment, although a transmissive-type projector has been described as an example of the projection-type display device, the invention is not limited thereto. For example, the invention may be applied to a reflective-type projector. Here, "transmissive-type" means that the optical modulation device transmits light as in a transmissive-type liquid crystal display device or the like, and "reflective-type" means that the optical modulation device reflects light as in a reflective-type liquid crystal display device or the like. Even in a case where an embodiment of the invention is applied to a reflective-type projector, advantages similar to those of the transmissive-type projector can be acquired.

In the above-described embodiments, although an example has been described in which the liquid crystal optical modulation device is used as the optical modulation device, the invention is not limited thereto. As the optical modulation device, generally, a device that modulates incident light in accordance with an image signal may be used. Thus, a light valve, a micro-mirror type optical modulation device, or the like can be used. As the micro-mirror type optical modulation device, for example, a DMD (Digital Micro-Mirror Device) (a trademark of Texas Instruments, Inc.) can be used.

In the above-described embodiments, although a projector using three liquid crystal optical modulation devices has been described as an example, the invention is not limited thereto. Thus, the invention can be applied to a projector that uses one, two, or four or more liquid crystal optical modulation devices.

The invention can be applied to a front projection-type projector that projects a projection image from the observation side or a rear projection-type projector that projects a projection image from a side opposite to the observation side.

The entire disclosure of Japanese Patent Application No. 2010-174405, filed Aug. 3, 2010 is expressly incorporated by reference herein.

What is claimed is:

1. A projection-type display device comprising:
   a solid-state light source;
   an optical modulation device that modulates light emitted from the solid-state light source;
   a projection optical system that projects the light modulated by the optical modulation device on a screen;
   a power source device that generates power used for driving the solid-state light source using power supplied from a power source;
   an instant interruption detecting device that detects an instant interruption of the power source; and
   a control device that, in a case where the instant interruption of the power source is detected by the instant interruption detecting device, performs control of extinguishing the solid-state light source during at least a part of an instant interruption period until recovery after the detection of the instant interruption of the power source.

2. The projection-type display device according to claim 1, wherein the control device performs control of extinguishing the solid-state light source over an entirety of the instant interruption period.

3. The projection-type display device according to claim 1, wherein the control device performs control of intermittently extinguishing the solid-state light source by intermittently stopping the power supplied from the power source device to the solid-state light source through pulse-width modulation.

4. The projection-type display device according to claim 1,
   wherein the solid-state light source includes a plurality of solid-state light source elements, and
   wherein the control device performs control of extinguishing at least one of the solid-state light source elements during at least a part of the instant interruption period.

5. The projection-type display device according to claim 4, wherein the control device performs control of extinguishing a part of the solid-state light source elements and intermittently extinguishing a remaining part of the solid-state light source elements over an entirety of the instant interruption period.

6. The projection-type display device according to claim 4, wherein the control device performs control of sequentially changing the solid-state light source element to be extinguished out of the solid-state light source elements.

7. The projection-type display device according to claim 6, wherein the control device changes the solid-state light source elements to be extinguished in units of the solid-state light source elements corresponding to a number set in advance.

8. The projection-type display device according to claim 1, wherein the control device performs control of decreasing a current supplied to the solid-state light source during a period, in which the solid-state light source is lighted, in the instant interruption period.

9. A method of controlling a projection-type display device that includes a solid-state light source, an optical modulation device that modulates light emitted from the solid-state light source, and a projection optical system that projects the light modulated by the optical modulation device on a screen, the method comprising:

detecting an instant interruption of a power source that is used for generating power used for driving the solid-state light source; and performing control of extinguishing the solid-state light source during at least a part of an instant interruption period until recovery after the detection of the instant interruption of the power source in a case where the instant interruption of the power source is detected in the detecting of an instant interruption of the power source.

\* \* \* \* \*